Patented Sept. 15, 1931

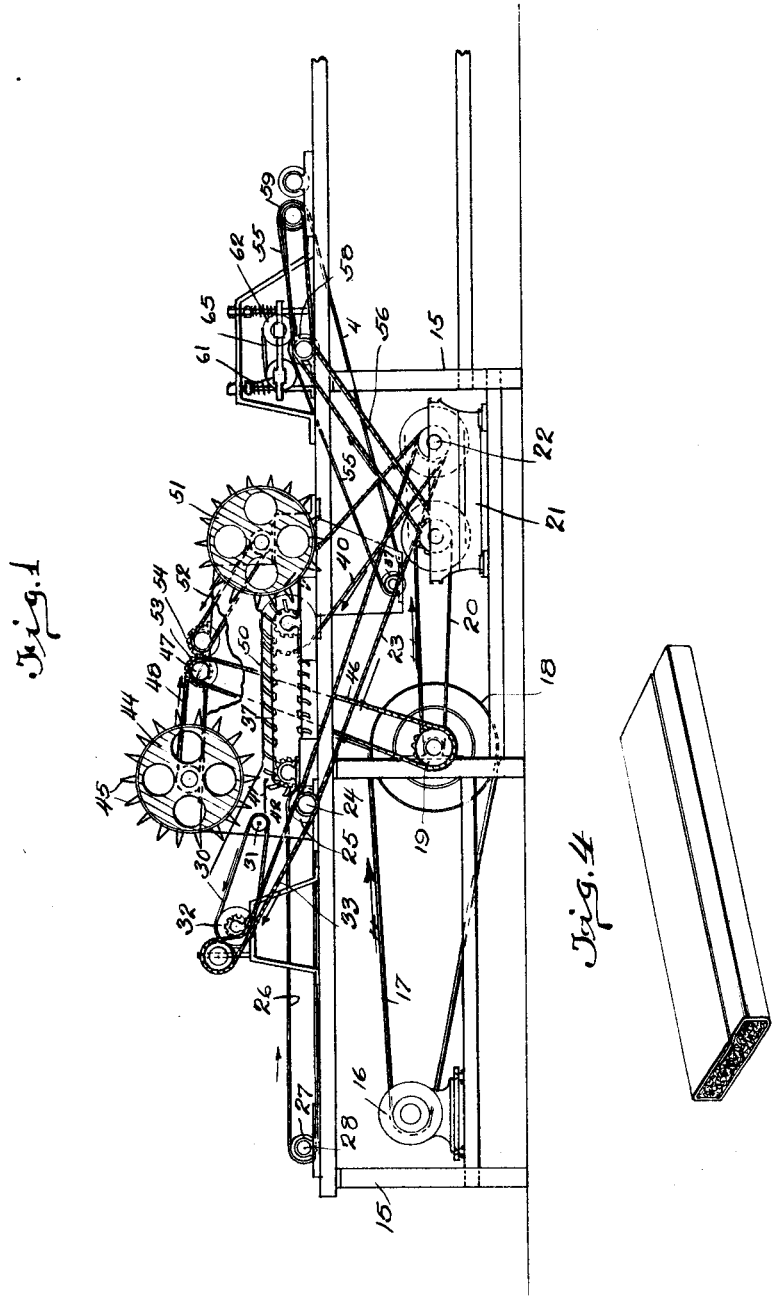

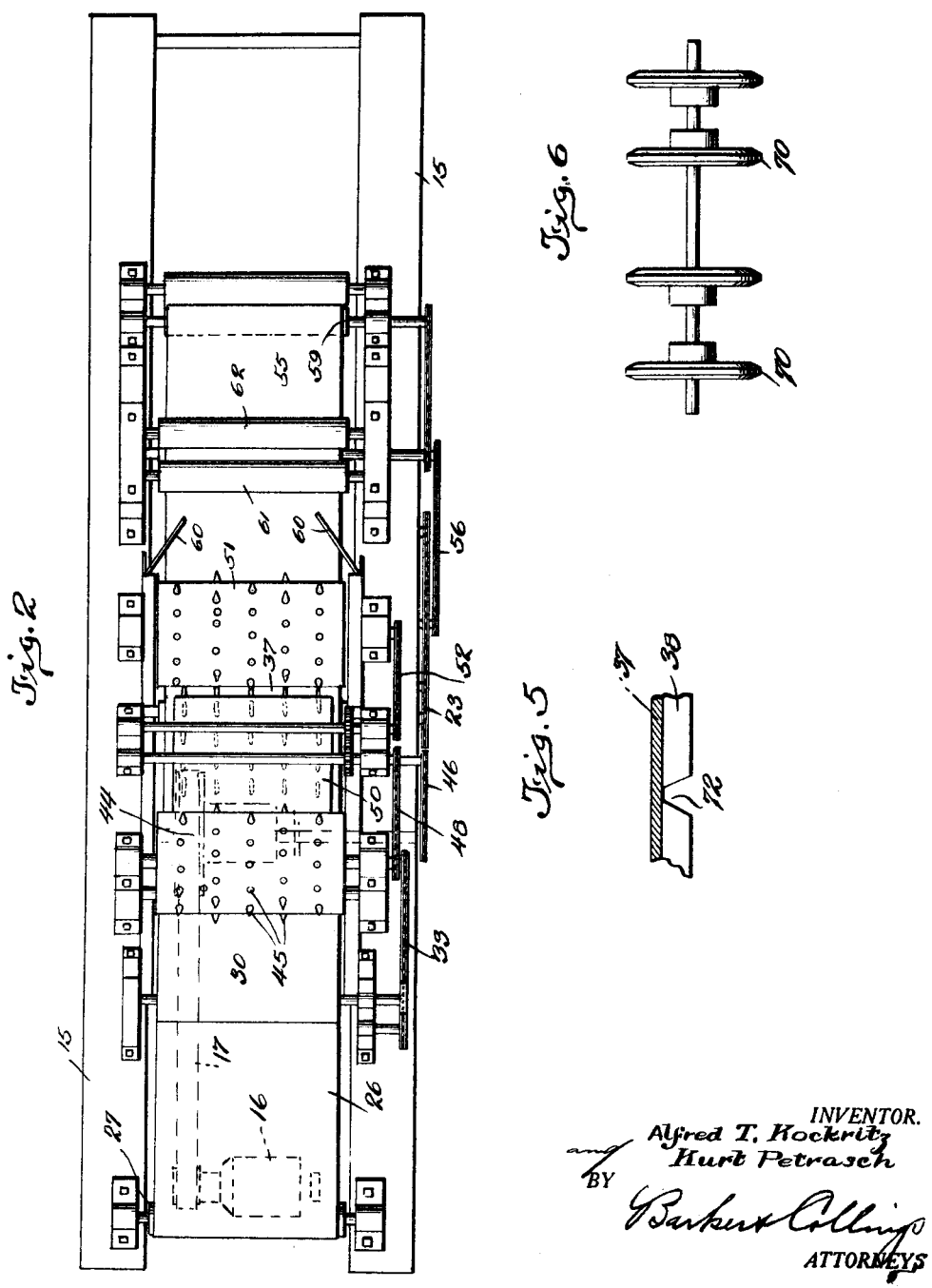

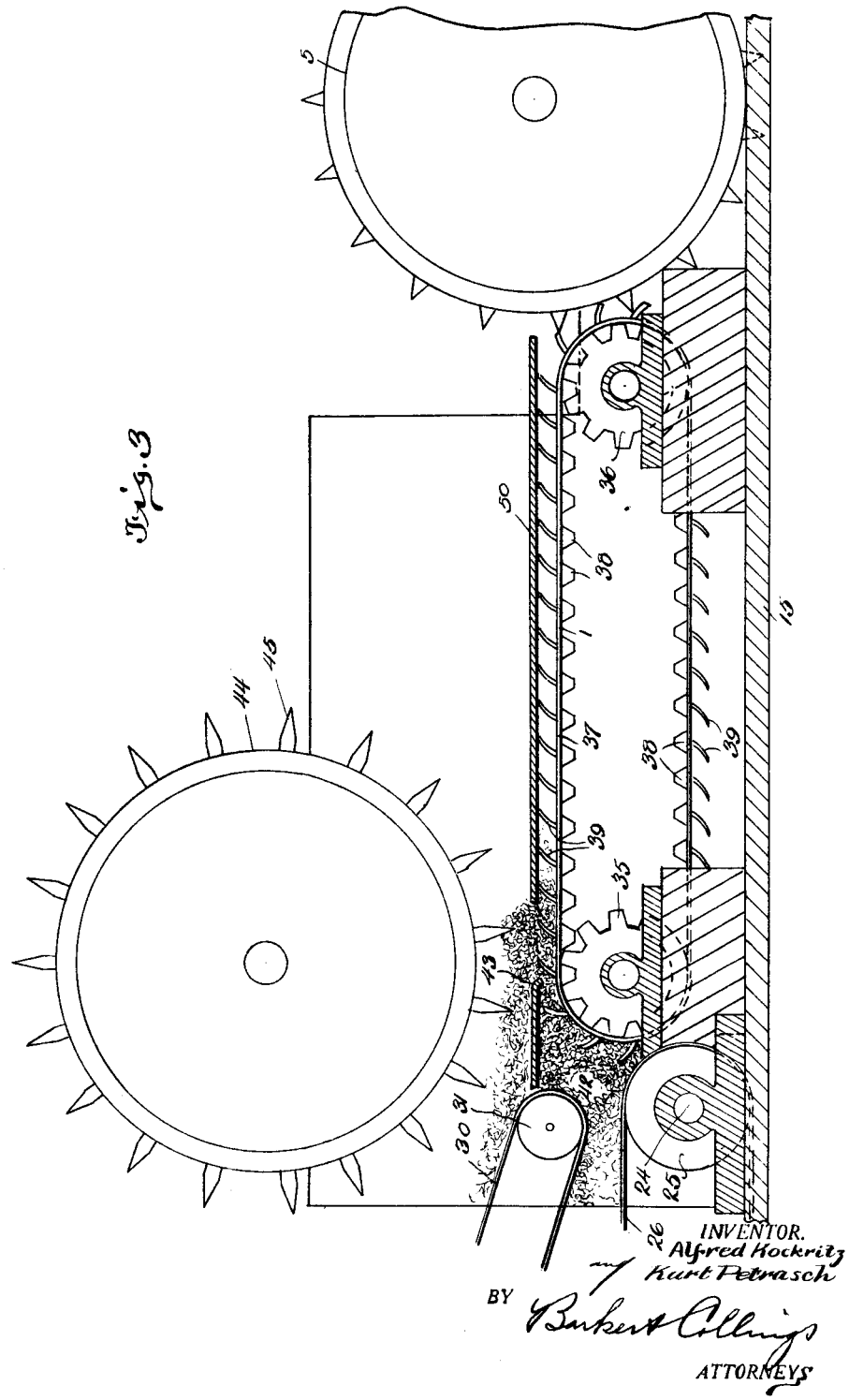

1,823,832

UNITED STATES PATENT OFFICE

ALFRED T. KOCKRITZ AND KURT PETRASCH, OF HENDERSON, KENTUCKY; SAID PETRASCH ASSIGNOR TO SAID KOCKRITZ

METHOD OF MAKING EXCELSIOR PADS

Application filed December 11, 1928. Serial No. 325,318.

This invention relates to a method of and apparatus for forming bats from shredded material, such as are used in furniture packing pads and the like, and has for one of its objects to improve the methods and apparatus which have been heretofore proposed.

In the manufacture of packing pads, which comprises a bat of excelsior or other similar shredded material enclosed by a paper wrapper, great difficulty has been experienced in the production of uniform bats which has resulted in a large percentage of rejected pads. The difficulties in the way of making the pads of uniform density result principally from the fact that the raw excelsior or other shredded material contains chips and lumps of material, comprising tightly interlaced shreds or fibers, which in prior processes and apparatus have not been disintegrated or eliminated, with the result that the finished pads are filled with these lumps and chips and are consequently not uniform throughout. Furthermore, due to the existence of these chips and lumps in the raw materials, the feeding of these materials to the bat-forming elements has been irregular so that at one instant an excess of material is being fed while at the next instant a deficiency of material is passing to the forming means, with the result that the pads are wavy.

It is the primary object of the present invention to provide a method and apparatus for overcoming these defects, whereby a pad may be produced at relatively high speed which will be free from lumps and waves and will be of substantially uniform density throughout.

With the above and other objects in view, the invention consists in the novel steps and combinations of steps constituting the process and in the novel combinations and arrangements of parts constituting the apparatus, all as will be more fully hereinafter described and particularly pointed out in the appended claims.

Referring to the accompanying drawings forming a part of this specification, in which like reference characters designate like parts in all the views:

Fig. 1 is a side elevational view of a machine constructed in accordance with the present invention;

Fig. 2 is a top plan view of the parts shown in Fig. 1.

Fig. 3 is an enlarged vertical sectional view, partly in elevation, of that portion of the apparatus which provides for the initial compression, expansion, separation, and recompression of the material;

Fig. 4 is a diagrammatic perspective view of a pad produced by this machine and method;

Fig. 5 is a fragmentary sectional elevational view of a slightly modified carrier belt of the machine; and Fig. 6 is an elevational view of a set of friction wheels which may be employed with the belt shown in Fig. 5.

Referring more particularly to the said drawings 15 designates a frame upon which is mounted a motor 16, which through a belt 17 and pulley 18 drives a counter shaft 19, suitably journaled in said frame.

A chain or belt 20 transmits power from the said counter shaft 19 to a change-speed device 21, here shown as of the type commercially known as a Reeves speeder. Inasmuch as this change speed device constitutes no particular part of the present invention it will not be described in detail. It may be said, however, that from one shaft 22 of the change speed device a belt or chain 23 transmits power to a shaft 24 which carries a roll 25 about which passes a feed belt 26 which also passes around a roll 27 journaled on a shaft 28 carried by the frame 15, all as will be clear from Fig. 1.

A compressing belt 30 is mounted above the feed belt 26, passing around rolls 31, 32, and being driven by means of a chain 33 from the shaft 24. The said pressure belt 30, as clearly shown in Fig. 1, converges toward the feed belt 26, whereby an increasing amount of pressure is placed upon the material carried by the feed belt 26, as the said material is carried into the machine.

To the right of the feed belt 26, as represented in Fig. 1, there is provided a pair of sprockets 35 and 36 suitably journaled upon the frame 15, about which sprockets passes an endless canvas belt 37 to the inner surface of which is secured the spaced strips or slats 38 which are adapted to engage between the teeth of the sprockets 35 and 36 after the manner of sprocket chain links. Each strip or slat 38 carries a plurality of curved prongs or projections 39, which project through the belt 37, as will be readily understood from Fig. 1. The belt or conveyor 37 is driven in a clockwise direction by means of a chain 40, which derives its power from the shaft 22 of the speed changing device 21.

Mounted upon the frame 15 in cooperative relation to the feed belt 26 and the sprockets 35 is a compressor plate 41, which, in conjunction with the belts 26, 30 and 37 forms what may be termed a receptacle or reservoir into which the raw excelsior or other shredded material is fed from the belt 26, at such a rate that this reservoir will always be kept full of material under considerable pressure, the said material being constantly removed by the prongs or projections 39 on the conveyor or belt 37.

As the material thus withdrawn from the reservoir 42 passes the down-turned edge 43 of the plate 41 the pressure will, of course, be relieved, whereupon the excelsior or other material will suddenly expand. At this point the expanded material is subjected to the action of a rapidly revolving picker roll 44 provided with the circumferentially arranged teeth or pins 45, which teeth or pins serve to pick off a portion of the expanded excelsior and throw it to the left as viewed in Fig. 1, upon the upper run of the pressure belt 30, which returns it to the feed belt 26, as will be readily understood. The said picker roll 44 is driven from the counter shaft 19 by means of the chain 46, counter shaft 47, and chain 48.

The subjection of the expanded excelsior to the action of the picker roll 44 at this point has been found in actual practice to result in a substantial elimination of all chips and lumps which may be present in the raw excelsior. The prongs or projections 39 of the conveyor 37 when forced into the excelsior have a tendency to force the chips and lumps upwardly and when the pressure upon the material is suddenly released as it passes the lip 43 these undesirable constituents are projected into the path of the teeth of the picker roll and are eliminated from the material which is to be used in the formation of the bat. The lumps are to a great extent broken up by the action of the picker roll, while the chips, owing to their greater weight, are fed with such velocity that they will be automatically separated from the lighter excelsior shreds and will be forced beyond the pressure belt 30 so that they are not returned to the feeding belt 26.

The excelsior which is not removed by the action of the picker roll is carried forwardly by the prongs 39 and conveyor 37 beneath a second pressure plate 50 which again compresses the material. As will be clear from the drawings this plate extends for a considerable distance and terminates over the sprockets 36 so that the material is subjected to recompression for a relatively long time. As the pressure is relieved a second time, due to the material being brought to the end of the presser plate 50, it is subjected to the action of a second picker roll 51 journaled on the frame and driven by means of a chain 52 which derives its power through gears 53 and 54 from the countershaft 47. This second picker roll 51 is likewise driven at a relatively high speed and it serves to effectively remove the shredded material from the prongs of the traveling belt 37 and to deposit it upon an inclined belt conveyor 55. This belt conveyor is driven from the speed changing device by means of a chain 56 that passes around suitable rolls 57, 58 and 59, as clearly shown in the drawings.

Adjustable wings or side plates 65 are provided above this conveyor so that the material as it passes between them may be compressed laterally to any desired dimensions, which dimensions of course may vary with the adjustment of the wings. After the material has been formed to the desired width it is again subjected to pressure by means of a presser belt 60 which passes around rolls 61 and 62 just above the roll 58. As will be clear from the drawings the roll 61 is offset more than the roll 62, whereby a gradually increasing pressure can be placed upon the material and due to the employment of the presser belt waves in the finished bat will be avoided, which ordinarily result from the use of a single presser roll located above the roll 58. As clearly shown the rolls 61, 62 and belt 60 are spring pressed.

From the belt 55 the formed bat is delivered to any suitable mechanism for enclosing it in its paper wrapping, but since this mechanism forms no part of the present mechanism it has not been disclosed.

The thickness of the pads may be effectively controlled without varying the speed of the delivery of the bats through merely speeding up the feeding mechanism and the belt 37 whereby more or less excelsior is deposited upon the discharge belt 55, which latter runs at a constant speed. Obviously if more material is fed to the belt 55 the resulting bats will be thicker, while if less material is fed to the belt they will be thinner.

The bats formed by this machine and method are found to be extremely uniform in density and to have square edges, as indicated in Fig. 4 of the drawings, in contradistinction to the bats heretofore made in which the thickness of the material tapers off toward the edges.

In lieu of the sprockets 35 and 36 plain disks or wheels 70 may be provided, as shown in Figs. 5 and 6 the outer peripheries of which are deflected, as indicated at 71, to engage correspondingly shaped recesses 72 formed in the cross members or slats 38 of the belt 37. The friction between the beveled surfaces of the slots and the wheels 70 is sufficient to drive the conveyor 37 just as efficiently as the sprocket arrangement shown in Fig. 1.

It is obvious that those skilled in the art may vary the precise steps and combinations of steps constituting the method as well as the details of construction and arrangements of parts constituting the apparatus without departing from the spirit of the invention, and therefore it is not wished to be limited to the above disclosure, except as may be required by the claims.

Claims:

1. The steps in the method of manufacturing uniform pads from excelsior and similar shredded materials, which comprise compressing the material; releasing the compression to permit said material to expand; removing a portion of the expanded material; and forming the remainder into a bat.

2. The steps in the method of manufacturing uniform pads from excelsior and similar shredded materials, which comprise compressing the material; releasing the compression to permit said material to expand, and substantially simultaneously therewith removing a portion of the expanded material; and forming the remainder into a bat.

3. The steps in the method of manufacturing uniform pads from excelsior and similar shredded materials, which comprise compressing the material; releasing the compression to permit the material to expand, and substantially simultaneously therewith removing a portion of the expanded material; recompressing the remainder; and forming said remainder into a bat.

4. The steps in the method of manufacturing uniform pads from excelsior and similar shredded materials, which comprise compressing the material; releasing the compression to permit the material to expand, and substantially simultaneously therewith removing a portion of the expanded material; recompressing the remainder to a lesser degree than in the first compression; and forming said remainder into a bat.

5. The steps in the method of manufacturing uniform pads from excelsior and similar shredded materials, which comprise feeding the material under compression to a reservoir; withdrawing said material from said reservoir while still under compression and permitting it to expand; removing a portion of said material substantially simultaneously with said expansion; and forming the remaining material into a bat.

6. The steps in the method of manufacturing uniform pads from excelsior and similar shredded materials, which comprise feeding the material under compression to a reservoir; withdrawing said material from said reservoir while still under compression and permitting it to expand; removing a portion of said material substantially simultaneously with said expansion; returning the segregated portion to the feeding means; and forming the remaining material into a bat.

7. The steps in the method of manufacturing uniform pads from excelsior and similar shredded materials, which comprise compressing the material; forcing a plurality of projections into the compressed material; suddenly releasing the compression to permit said material to expand, and said projections to force chips, lumps and the like toward one side of the mass; removing the material at that side; and forming the unremoved material into a bat.

8. The steps in the method of manufacturing uniform pads from excelsior and similar shredded materials, which comprise compressing the material; forcing a plurality of projections into the compressed material; suddenly releasing the compression to permit said material to expand, and said projections to force chips, lumps and the like toward one side of the mass; removing the material at that side and imparting sufficient velocity thereto to cause a separation of the chips, lumps, etc. from the rest of the removed material; and forming the unremoved material into a bat.

In testimony whereof we affix our signatures.

ALFRED T. KOCKRITZ.
KURT PETRASCH.